United States Patent
Harter, Jr.

(10) Patent No.: US 8,527,868 B2
(45) Date of Patent: Sep. 3, 2013

(54) SYSTEMS AND METHODS FOR DOCUMENT ANNOTATION

(75) Inventor: William Wood Harter, Jr., Aliso Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 1331 days.

(21) Appl. No.: 12/035,639

(22) Filed: Feb. 22, 2008

(65) Prior Publication Data

US 2009/0217148 A1   Aug. 27, 2009

(51) Int. Cl.
G06F 17/00   (2006.01)

(52) U.S. Cl.
USPC ............................. 715/230; 715/234

(58) Field of Classification Search
USPC ............... 715/230–235, 760; 717/115, 112
See application file for complete search history.

(56) References Cited

U.S. PATENT DOCUMENTS

| | | | | |
|---|---|---|---|---|
| 5,761,684 A * | 6/1998 | Gibson | ......................... | 715/210 |
| 5,819,092 A * | 10/1998 | Ferguson et al. | ............. | 717/113 |
| 5,862,379 A * | 1/1999 | Rubin et al. | ................... | 717/109 |
| 6,721,921 B1 * | 4/2004 | Altman | ......................... | 715/210 |
| 6,981,215 B1 * | 12/2005 | Lindhorst et al. | ............. | 715/207 |
| 7,162,314 B2 | 1/2007 | Fay et al. | | |
| 7,272,788 B2 * | 9/2007 | Anderson et al. | ............. | 715/210 |
| 7,418,656 B1 * | 8/2008 | Petersen | ....................... | 715/230 |
| 7,506,246 B2 * | 3/2009 | Hollander et al. | ............ | 715/230 |
| 7,594,166 B1 * | 9/2009 | Ramakrishna et al. | ........ | 715/234 |
| 7,793,226 B2 * | 9/2010 | Sorenson et al. | ............. | 715/777 |
| 7,970,647 B2 * | 6/2011 | Koeppel et al. | .............. | 705/14.1 |
| 2005/0149857 A1 | 7/2005 | Negishi et al. | | |
| 2005/0171976 A1 | 8/2005 | West et al. | | |
| 2005/0190561 A1 | 9/2005 | Ng et al. | | |
| 2005/0198202 A1 | 9/2005 | Yamamoto | | |
| 2006/0026518 A1 | 2/2006 | Jung et al. | | |
| 2006/0218554 A1 | 9/2006 | Tobias et al. | | |
| 2006/0282762 A1 * | 12/2006 | Diamond et al. | ............. | 715/511 |
| 2007/0006148 A1 | 1/2007 | Varshney et al. | | |
| 2007/0061700 A1 | 3/2007 | Kothari et al. | | |
| 2007/0112797 A1 | 5/2007 | Kawabata et al. | | |
| 2007/0113237 A1 | 5/2007 | Hickson | | |
| 2007/0179987 A1 | 8/2007 | Lim | | |

OTHER PUBLICATIONS

Toujilov V. I.; Nagl, B.S.; "Client's Script Execution in Semantic Web Services", 6 pages.
Laurent, D.; Laurent V.; "An Annotation Tool for Web Browsers and It's Applications to Information Retrevial", 16 pages.

* cited by examiner

*Primary Examiner* — Thu Huynh
(74) *Attorney, Agent, or Firm* — Terry J. Carroll; Edell, Shapiro & Finnan, LLC

(57) ABSTRACT

A method and system for document annotation. A script editor is combined with a document rendering or client display system that allows a user to develop a customizable programmatic annotation script that is thereafter saved and associated with a document. When the document is selected for viewing, the rendering system renders the document and then, using a script language interpreter, runs the annotation script such that a user customizable programmatic annotation is rendered on top of the document. Annotations may include, for example, animation, sounds, or time-delayed effects. Server side annotation scripts may also be implemented thereby allowing management of documents on a document-by-document basis.

13 Claims, 4 Drawing Sheets

SYSTEMS AND METHODS FOR DOCUMENT ANNOTATION

FIELD OF THE INVENTION

The present invention is related to rendering, displaying, and managing documents, and more particularly to systems and methods for annotating documents.

BACKGROUND OF THE INVENTION

Document annotation is a powerful tool for, among other things, emphasizing particular portions of a document, helping to summarize longer text passages of a document, and showing connections among different portions of a document. Conventionally, readers of a paper document might highlight a passage of the document, make notes in the margins of the document, or circle, underline or place an asterisk next to selected passages of the document. These types of markings are typically added to a document that has already been completed by a given author. The reader of the document may then subsequently make markings on the document for his own personal use, or for the benefit of others.

Document annotation with electronic documents, e.g., those stored in a memory of a computer system and displayed on a computer screen for viewing, has seen increased acceptance in the recent past. For example, word processor software such as Microsoft Word™ (Redmond, Wash.) allows users to highlight and underline selected text, and even to "attach" comments at selected locations within a document. When a pointing device, such as a mouse, passes over the selected location to which a comment has been attached, a comment "bubble" might be displayed. The bubble might then subsequently disappear when the mouse is moved away from that location.

Similarly, Adobe Acrobat™ provides built-in document annotation functionality. Given a document stored in accordance with Adobe's PDF standard, Acrobat provides a plurality of possible commenting and marking-up annotation tools, including highlighting, text bubbles and call-outs. In addition, Acrobat provides the ability to place various shapes such as circles, arrows and lines on the PDF document. These annotations can also be saved with the original PDF document.

While the Microsoft Word™ and Adobe Acrobat™ approach to document annotation can be very powerful in that one's own markings can be relatively easily introduced into a document, the types of annotations that are possible within computer software applications such as Word and Acrobat are limited or, more precisely, are limited to specific functionality that is already or pre-built into the given software application. As such, the types of available annotations are, in effect, predetermined. Consequently, there remains a need for more expansive forms of document annotation.

SUMMARY OF THE INVENTION

As mentioned, known documentation annotation solutions allow users to place only predetermined types of text markings or drawings "on top of" a document when it is displayed.

In accordance with the present invention, however, a more flexible and complimentary annotation solution may be implemented. More specifically, embodiments of the present invention allow a user to attach a user-customizable script to a document (using, e.g., a script editor) that may be used to programmatically draw and interact with document annotations. This allows for virtually infinitely complex and interactive annotations to be applied to a document (as the scripts are user-defined). In a particular embodiment, a document display system includes a script interpreter that is invoked when the document is selected for viewing. For example, once the document is rendered in its conventional manner, the script interpreter may then be invoked to run any annotation script that has been associated/saved with the document. The same script may also be used to interact with a content management server during specific content events (e.g., access to the document has been requested), thereby enabling server customization (e.g., document management) on a document-by-document basis.

The methodology of the present invention provides the ability to attach a script to a document that is called during a rendering phase of that document. The script may be interactive, e.g., follow/retrieve mouse events and update the document display interactively, and/or may be responsive to external events, e.g., time of day or date, and provide different annotations in view of the external event.

The script may have additional or multiple entry points that may be called based on server-side events. As a consequence, such an annotation script (again, user customizable) allows for the customization of the server on a document-by-document basis thereby providing significant flexibility in the lifecycle of a given document.

These and other features of embodiments of the present invention and their attendant advantages will be more fully appreciated upon a reading for the following detailed description in conjunction with the associated drawings.

DETAILED DESCRIPTION

Figure 1:
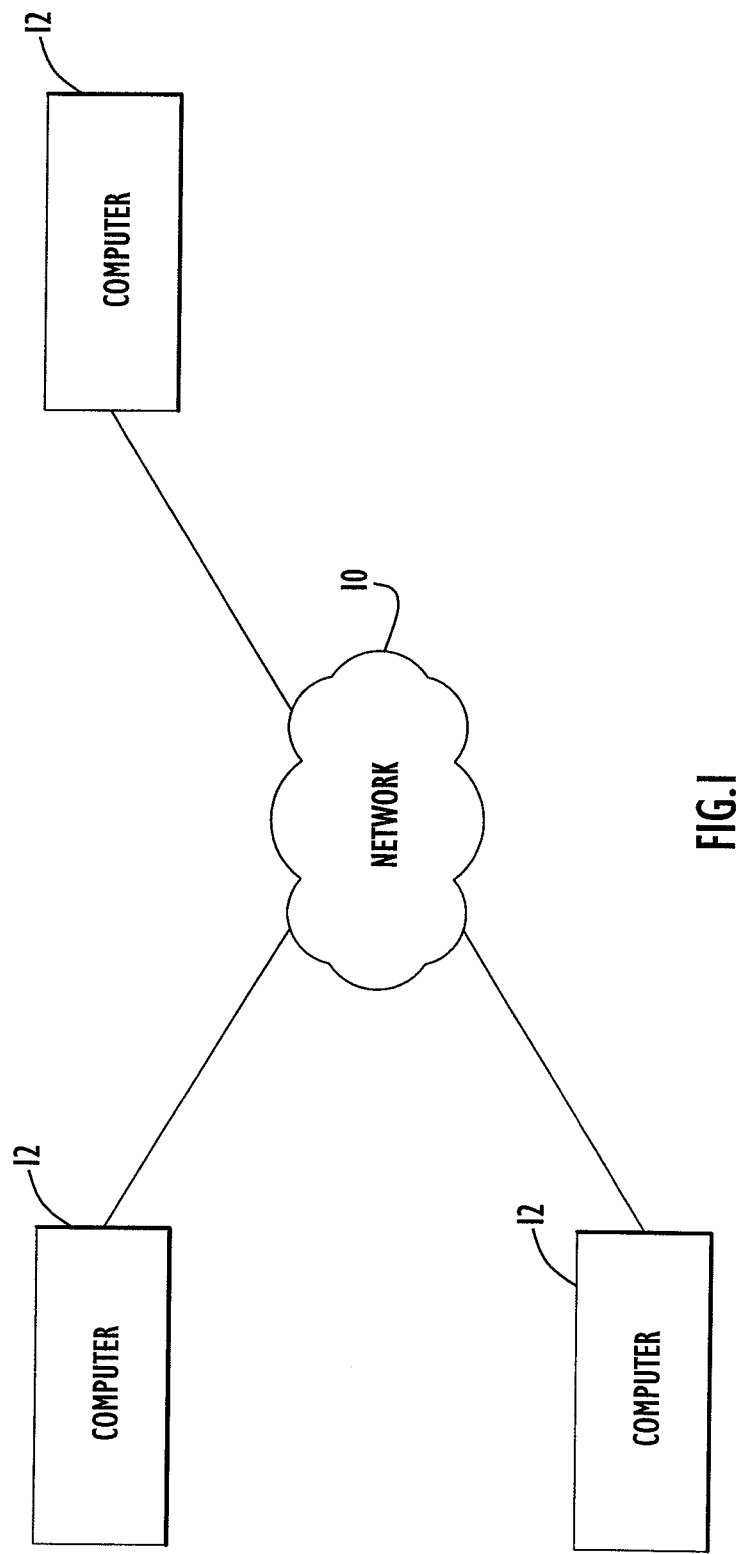
FIG. 1 depicts an environment in which embodiments of the present invention may operate.

FIG. 1 depicts an environment in which embodiments of the present invention may operate. More specifically, FIG. 1 shows a plurality of computers 12 that are interconnected via a network 10. Computers 12 may be thin-clients, conventional clients, or servers. Network 10 may comprise any one or combination of electronic networks, including local area networks (LANs), wide area networks (WANs), wired and wireless networks, or the Internet, among others. Those skilled in the art will appreciate that there are many known ways to interconnect two or more computers and that the foregoing list of network types is merely exemplary. In accordance with the present invention, any one or more of computers 12 may incorporate aspects of the present invention, as is described more fully below.

Figure 2:
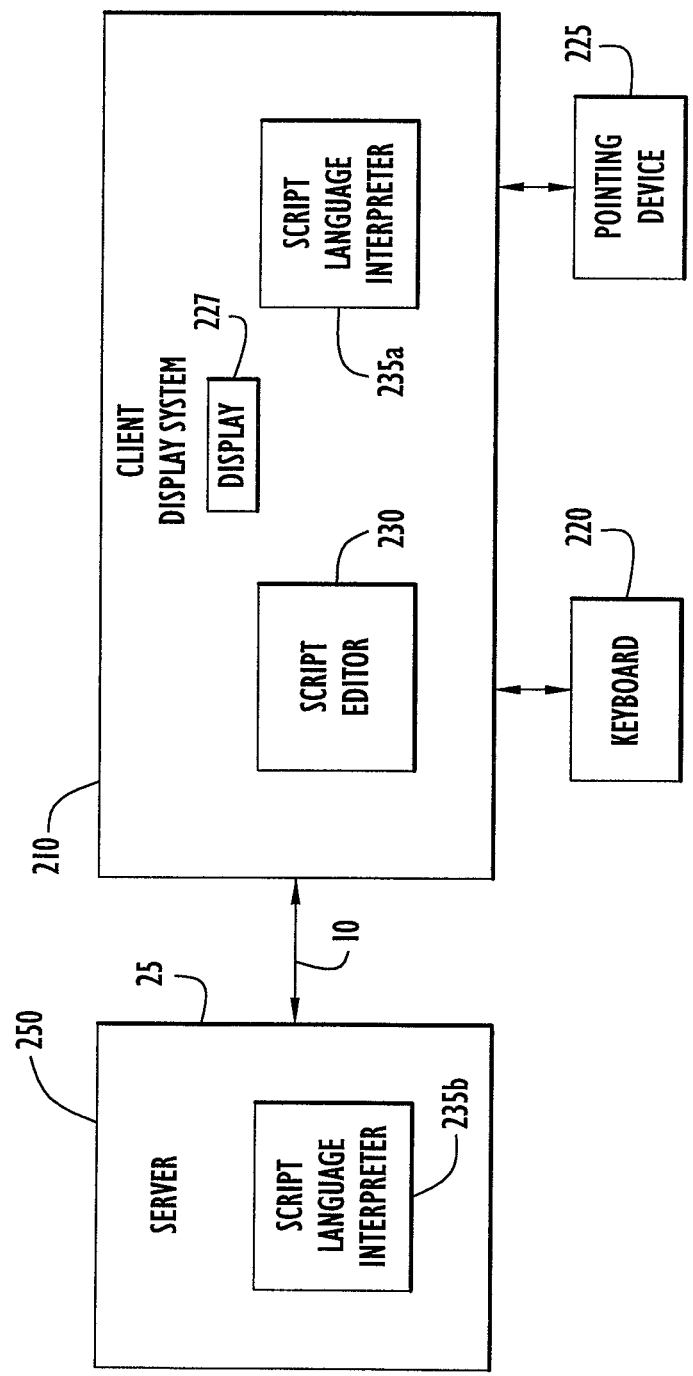
FIG. 2 depicts components of an exemplary display system that incorporates annotation scripting in accordance with an embodiment of the present invention.

Referring now to FIG. 2, a client display system 210 and a server 250 are shown. These components, individually or separately, may reside on any computer 12 shown in FIG. 1. That is, a given computer 12 might host both the client display system 210 and the server 250. These components may also be connected to one another via network 10 as shown in both FIGS. 1 and 2. Client display system 210 is preferably in communication (either directly or through a conventional computer operating system) with a keyboard 220 and pointing device 225, such as a mouse. These latter two components allow a user to interact with computer 12 and thus client display system 210.

In addition to the foregoing components, client display system 210 includes a display 227 such as a CRT display, flat panel display, or any other suitable display technology, script editor 230 and a script language interpreter 235a.

Generally speaking, and as used herein, a "script" is a program or sequence of instructions that is interpreted or carried out by another program rather than by the computer processor (as a compiled program is). Some languages have been conceived expressly as script languages. Among the most popular are Perl, Rexx (on IBM mainframes), JavaScript, and Tcl/Tk. In the context of the World Wide Web, Perl, VBScript, and similar script languages are often written to handle forms input or other services for a Web site and are processed on a Web server. In a typical use, a JavaScript script in a Web page may run "client-side" on a Web browser.

In general, script languages are easier and faster to code compared to more structured and compiled languages such as C and C++. On the other hand, a script may take longer to run compared to a compiled program, since each instruction is first being handled by another program, e.g., an interpreter, rather than directly by the basic instruction processor. In view of the relative ease of coding or programming a script, scripting has been found to be particularly useful in connection with aspects of the present invention, namely developing and associating with documents user-customizable document annotation scripts.

Script editor 230 may be selected from one of many well-known script editors. Such programs operate as computer text editors that may be designed specifically for coding scripts, such that, e.g., syntax errors for a given scripting language are shown as a user codes a script. However, any text editor may be implemented for script editor 230 so long as a desired script can be written and saved, preferably in connection with a particular document, as will be more fully explained below. Script language interpreter 235a is a program that receives a script (generated with a script editor) and causes another program or device to operate in accordance with the instructions in the script. Such script language interpreters are well-known in the art.

In accordance with an embodiment of the present invention, a script language interpreter 235b may also be loaded on server 250. In such as case, server 250 may be configured to run a script that is associated with a given document, where the document itself and the related script are stored on server 250.

Figure 3:
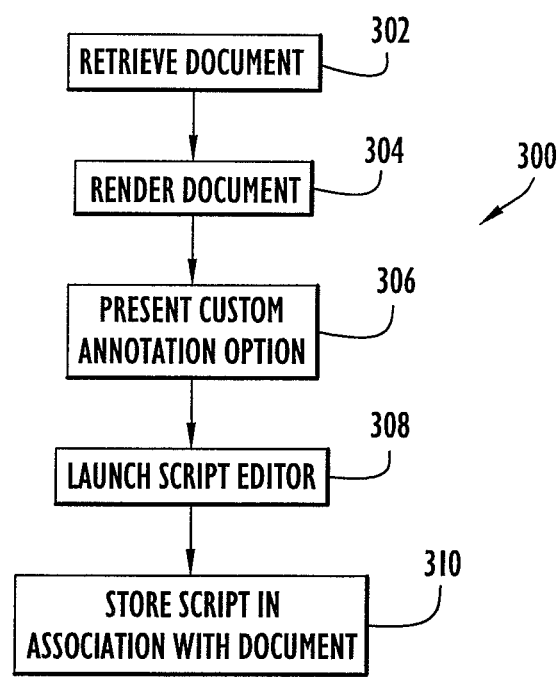
FIG. 3 shows an exemplary series of steps for adding an annotation script to a document in accordance with an embodiment of the present invention.

FIG. 3 shows an exemplary series of steps 300 for adding an annotation script to a document in accordance with an embodiment of the present invention. At step 302, a document is retrieved from the memory of a computer. The memory may be volatile or non-volatile memory. The document, e.g. a text document, graphics document, etc.) is then rendered, at step 304, on a display, such as display 227 in client display system, in accordance with conventional technology, such as Adobe Acrobat™, or any other suitable document rendering software. Then, in accordance with the present invention, at step 306, the document rendering software presents to a user an option to add a custom annotation to the document. In other words, in addition to the conventional line drawings, highlighting and call-out annotation options, a separate, e.g., "clickable" element (such as an icon or pull down menu option) is displayed or displayable. When the clickable element is selected, a script editor (such as script editor 230 of FIG. 2) is launched, as indicated by step 308.

At this point, a user can code, using the script editor, a user-customizable script that will provide custom annotations to the document when the script is run. A user may also re-use a script that has been, e.g., posted on the Internet. Notably, the user-coded scripts are not limited to the predetermined styles of annotations that are conventionally available with conventional document rendering software. Virtually any type of annotation is now possible, as long as the script language interpreter can properly interpret the script code. For instance, moving lines and other shapes, animation, audible sounds, or even actions or events that are time delayed or occur after a predetermined period of time are considered to be within the scope of the present invention.

Once the script is coded, it is preferably stored in association with the document for which the script was written. The script may be stored directly with the document as part of document data, or may be stored as an attachment to the document that may be independently (and preferably automatically) launched every time the document is retrieved and rendered.

Figure 4:
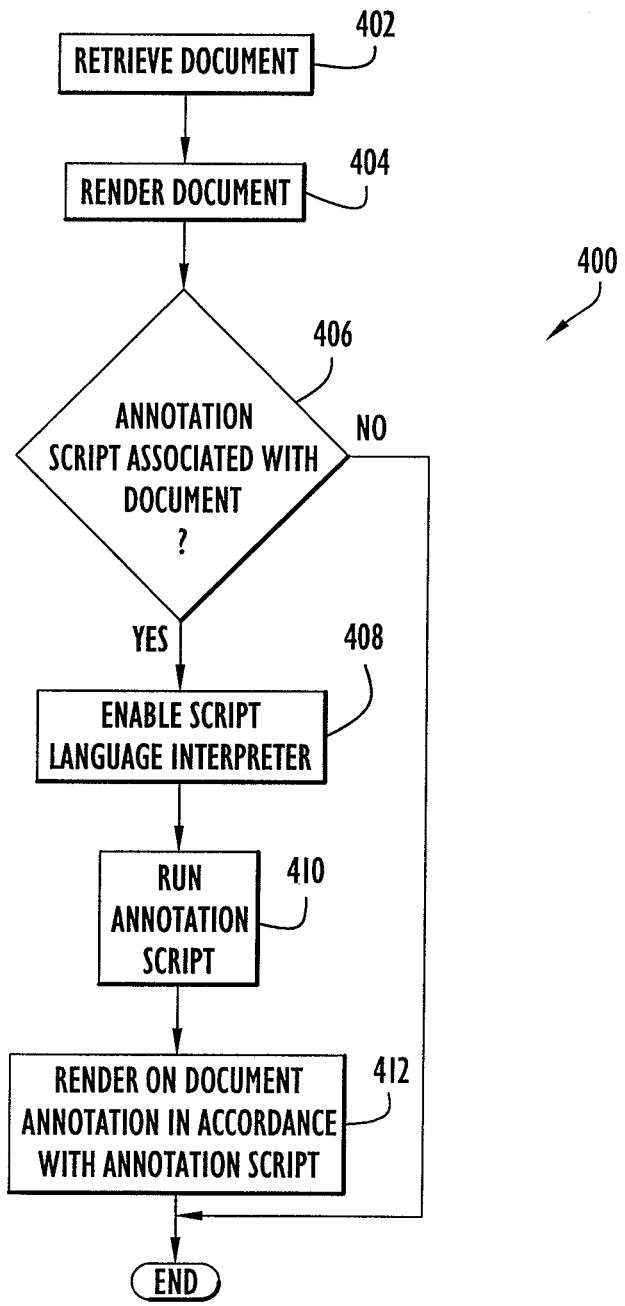
FIG. 4 shows an exemplary series of steps for rendering a document and rendering an annotation based on an annotation script in accordance with an embodiment of the present invention.

More particularly, FIG. 4 shows an exemplary series of steps 400 for rendering a document and an annotation based on an annotation script in accordance with an embodiment of the present invention. At step 402, a document is retrieved by, e.g., a document rendering software program. At step 404, the document is rendered in the conventional manner. Then, at step 406, the document rendering software program is configured to determine whether there is an annotation script associated with the document that has been retrieved and rendered. If there is no such annotation script, then the document remains rendered as is conventional.

However, if at step 406 it is determined that an annotation script is associated with the document that has been rendered then, at step 408, a script language interpreter may be enabled (to the extent such a step is necessary) and, at step 410, the annotation script is run or launched using the script language interpreter. In other words, the script language interpreter receives the sequence of script instructions and causes one or more other programs to cause one or more annotation effects to be shown or rendered "on top of" the document. Specifically, at step 412, annotations are rendered on the document in accordance with the annotation script as interpreted by the script language interpreter.

Thus, as explained, a script or scripting language interpreter is added or incorporated into a client (image) display system, and optionally also on a server side content management system. The client display system (e.g., document rendering software), which conventionally allows static annotations, is further provided with a script editor that enables a user to code his own script and/or import already-coded scripts. The scripts themselves may be stored and retrieved with the document's image data, in a manner similar to static annotations data. When the script runs, it runs within a context that includes information about the server and information about the actual document. This context can provide more detailed information about the specific document and the server environment where it is stored or the client where it is being displayed. This context can include references to the document management server where the document is stored, i.e. Server Name, Server Address, Last Modification Time, a history of user modifications or any other type of storage specific information. This context can include information about the client where the document is being displayed, i.e., IP address, user name viewing the document, or the width and height of the display.

Both the client display system 210 and server system 250 are configured to create a context object to pass to the script on the various events, some of which are outlined below. The same script could be used for the server side, although it is typically more preferable to separate an annotation script from a content management script so that different security can be applied to each of the scripts.

Script Context for Rendering

The script context for rendering may have a function that is called after rendering the document image. This allows for programmatic drawing of information on top of the rendered image. The data associated with that context might include information about, e.g., the document and content management system. This information could include, for example, document identifier (docid), dates (creation, modifications), reference documents, owner, security and any other information associated with the document on a server or content management system.

Interactivity may also be added to annotation scripts. For instance, mouse events may be tracked and a script might use the mouse location (or clicks, acceleration, or speed, etc.) to generate more or less of a selected annotation, or more or fewer annotations, etc. Communication may also be established, in the context of the script, back to the content management server.

Script entry points for rendering may include:
Document View Initialization
Document Rendering
Mouse and Keyboard Interaction
Script initiated timer events Script Context for Content Management A document lifecycle in a content management system includes many things beyond rendering. Script entry points could be attached to many types of events that might include, for example:
Document Changed
Document View
Document Security
Document Archival
Document Copy
Document Deletion The information associated with the context might further include similar information to that used in rendering, but may also allow for a closer link to the document management system given that these types of events can be executed on the content management server.

A scripting language that may be used in connection with the present invention may be any existing scripting language. Indeed, a client display system, or more generally a content management system, could allow for multiple scripting languages. The language could be identified within the script and the appropriate interpreter called (e.g., enabled, as per step 408 in FIG. 4) based on the specified language.

Based on the current state of scripting languages, the scripting language known as "Groovy" (http://groovy.code-haus.org/) may be used as the language of choice for annotation scripting. Groovy is a well-known scripting language closely associated with the Java language and the Java Virtual Machine. It has been growing in popularity over the last five years. PHP, another well-known scripting language, is another possible option. However, this script language may be too closely tied with HTML generation and, as a result, may not include the rendering flexibility that Groovy and Java include by default.

Sample Script

The following sample code is only included herein as a reference and is not necessarily syntactically correct. This script could be associated with the rendering of a document. It shows a method that programmatically adds an annotation circle in the center of the rendered document and another circle that follows the mouse. The second script is a load method that sets up the mouse tracking system while the document is being viewed.

```
int mLocX;
int mLocY;
public void onRender(Graphics g, Document d)
{
    g.drawString(10,10, d.getDocumentId( ));
    // draw a 10x10 circle in the middle of the document
    g.drawCircle(          d.getDocumentWidth( )/2-5,
                           d.getDocumentHeight( )/2-5,
                           10,
                           10);
    // draw 6x6 circle where the mouse is
    // this could also be an image of some sort
    g.fillCircle(mLocX-3,mLocY-3,6,6);
}
public void onLoad(Document d)
{
    // when this document is loaded for rendering, attach
    // a mouse motion listener.
    addMouseMotionListener(new MouseMotionAdapter( ) {
        public void mouseMoved(MouseEvent e) {
            mLocX = e.getX( );
            mLocY = e.getY( );
            repaint( );
        }
    }
}
```

Server side script annotations may be executed on the server side when the document is viewed. This particular script sends an e-mail when a specific document is accessed. For highly sensitive documents this could add extra logging and add an extra layer of security.

```
public void onView(Document d, Server s)
{
    if (s.getCurrentUser( ).getName( ).equals("Wood"))
    {
        s.sendEmail(alert@yourcompany.com,
            "Warning, "+s.getCurrentUser( ).getName( )+
            " accessed document "+d.getDocumentId( )+
            ". This may be breach of security!");
    }
}
```

These types of scripts allow very simple customization on a document-by-document basis and greatly increase the flexibility of an Enterprise Content Management system.

Web Servers as Content Management Systems

Server-side annotation scripts may also, in accordance with embodiments of the present invention, be attached to documents stored in web servers. Web server scripting is currently focused only on adding scripts that generate dynamic content. However, server-side annotation scripts could be associated with the HTML or web based script to activate when events pertaining to specific pages occur. The script can be attached to the document, and not necessarily included within the document, and would allow for server notification or added functionality based on various types of document events (e.g., access, modify, content generation, etc.). With these types of sever-side scripts associated with documents, enhanced security and monitoring capabilities are possible.

Security

Security is always an issue when users are given the ability to attach programmatic information/instructions/code to a document. While scripts running in a Java Virtual Machine on client display system 210 would likely be benign, there might still be a need to turn off a given script if a serious problem were encountered (e.g., an infinite loop). Accordingly, in an embodiment of the present invention, there may be implemented on server 250 a permission system configured to only allow certain individuals to add scripts with varying degrees of functionality. A simple script that, e.g., posted a message to a log would not require as much trust as a script that changed the document information. Stated differently, since significant changes to a document or a database might result from an annotation script, it may be desirable to restrict scripting to only those persons who are trusted on the system. This issue is similar to current security concerns governing who has administrative privileges and who has read and write privileges on a content management server. Thus, in the same vein, there may need to be a security context for script creation and runtime.

From the foregoing, those skilled in the art will appreciate that the embodiments of the present invention described herein provide a new type of annotation system that does not rely on predefined annotation elements, but gives programmatic control of annotation elements on a document-by-document basis through the use of attached or embedded user-customizable scripts. The present invention may also add scripting capability to documents on a server side of a content management system allowing users to customize document handing on an individual document basis.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of document annotation suing user-customizable programmatic scripts, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of annotating a document, comprising:
   rendering a document on a display using a document rendering system;
   while the document is being displayed, launching a script editor configured to receive script code, the script editor configured to show to a user syntax errors in connection with a given scripting language and to import already-coded scripts to obtain a user-defined and customizable script;
   associating the user-defined and customizable script with the document; and
   calling the user-defined and customizable script such that the document is rendered with an annotation consistent with instructions provided in the user-defined and customizable script,
   wherein both the document rendering system and a server on which the document is stored are configured to create a context object that is passed to a script language interpreter that runs the user-defined and customizable script,
   wherein the context object includes, at least, security information associated with the document.

2. The method of claim 1, wherein the document is a text document.

3. The method of claim 1, wherein the document is a graphics document.

4. The method of claim 1, wherein the user-defined and customizable script comprises code that is configured to interact with a person viewing the document.

5. The method of claim 4, wherein the code tracks a location of a pointing device.

6. A document rendering system, comprising:
   a client image display system including a display operable to display a stored document, the client image display system including a script editor and a script language interpreter,
   wherein the client image display system is configured, while the stored document is being displayed, to accept a user customizable annotation script via the script editor and to show to a user syntax errors for a given scripting language and to import already-coded scripts, to store the annotation script in association with the stored document, and thereafter to run the annotation script using the script language interpreter while the document is displayed,
   wherein both the client image display system and a server on which the document is stored are configured to create a context object that is passed to the script language interpreter, and wherein the context object includes, at least, security information associated with the document.

7. The document rendering system of claim 6 wherein the server comprises a script language interpreter, which runs the annotation script.

8. The document rendering system of claim 6, wherein the annotation script monitors a location of a pointing device and causes an annotation to be rendered on the document based on the location of the pointing device.

9. The document rendering system of claim 8, wherein the annotation script causes an event to occur after a predetermined amount of time.

10. The document rendering system of claim 6, wherein the annotation script comprises multiple entry points.

11. The document rendering system of claim 6, wherein one of a plurality of script language interpreters is enabled based on a language of the annotation script.

12. The document rendering system of claim 6, wherein the annotation script is stored as part of the document.

13. The document rendering system of claim 6, wherein the annotation script is stored as an attachment to the document.

\* \* \* \* \*